US007946916B2

(12) United States Patent
Naicker

(10) Patent No.: US 7,946,916 B2
(45) Date of Patent: May 24, 2011

(54) VARIABLE PAYOUT WAGER GAMES

(75) Inventor: Theo Naicker, Durban (ZA)

(73) Assignee: Waterleaf Ltd., Douglas, Isle of Man (GB)

( * ) Notice: Subject to any disclaimer, the term of this patent is extended or adjusted under 35 U.S.C. 154(b) by 576 days.

(21) Appl. No.: 11/332,386

(22) Filed: Jan. 12, 2006

(65) Prior Publication Data

US 2007/0167235 A1 Jul. 19, 2007

(51) Int. Cl.
*A63F 13/00* (2006.01)

(52) U.S. Cl. .......................................... 463/20; 463/25

(58) Field of Classification Search .............. 463/16–22, 463/39–43, 25

See application file for complete search history.

(56) References Cited

U.S. PATENT DOCUMENTS

| | | | | |
|---|---|---|---|---|
| 5,421,576 | A | 6/1995 | Yamazaki et al. | 273/138 A |
| 5,833,538 | A * | 11/1998 | Weiss | 463/21 |
| 6,155,925 | A * | 12/2000 | Giobbi et al. | 463/20 |
| 6,257,981 | B1 * | 7/2001 | Acres et al. | 463/26 |
| 6,439,994 | B2 | 8/2002 | Tsukahara | 463/20 |
| 6,663,487 | B1 | 12/2003 | Ladner | 463/13 |
| 2002/0045473 | A1 * | 4/2002 | Walker et al. | 463/20 |
| 2002/0065123 | A1 * | 5/2002 | Packes et al. | 463/16 |
| 2003/0207707 | A1 * | 11/2003 | Slomiany et al. | 463/16 |
| 2004/0166922 | A1 * | 8/2004 | Michaelson et al. | 463/20 |
| 2004/0185931 | A1 * | 9/2004 | Lowell et al. | 463/17 |

FOREIGN PATENT DOCUMENTS

| | | |
|---|---|---|
| DE | 19840088 | 3/2000 |
| GB | 2201279 | 8/1988 |

OTHER PUBLICATIONS

Extended European Search Report in European Patent Application 07250133.1, dated Nov. 23, 2007.

* cited by examiner

*Primary Examiner* — Peter DungBa Vo
*Assistant Examiner* — Allen Chan
(74) *Attorney, Agent, or Firm* — McDonnell Boehnen Hulbert & Berghoff LLP

(57) ABSTRACT

A central gaming server communicates with a gaming workstation over a network, such as a local area network or wide area computer network. The gaming server makes an initial determination of payout percentage for an instance of a game engaged in by the workstation, and generates results of turns of the game in accordance with the initial payout percentage. In one embodiment, the payout percentage is dynamically changed by the gaming server, and it generates additional results of turns of the game using the new payout percentage. Triggers for determining a new payout percentage could be that a predetermined number of turns of play at the initial payout percentage have occurred, the elapsing of a certain amount of time, or the player logging off the game and then logging back on. In further embodiments, the gaming workstation includes a processor and instructions for locally determining an initial payout percentage, the results of play, and dynamically changing the payout percentage without requiring communication with a central gaming server.

31 Claims, 7 Drawing Sheets

VARIABLE PAYOUT WAGER GAMES

STATEMENT OF FEDERALLY SPONSORED RESEARCH

Not applicable.

FIELD OF THE INVENTION

This disclosure relates generally to electronic gaming systems and more particularly to methods and apparatus for playing wager games in which the payout for a turn of an instance of the game is variable. Specific examples of variable payout games suitable for this invention include various types of slots games and electronic scratch ticket-type games. Such games can be played on a computer workstation communicating over a computer network such as the Internet with a central gaming server. Such games can also be played on a workstation taking the form of an electronic video gaming terminal that is installed in a casino-type environment.

RELATED ART

The game of slots is probably the most popular and widely played single-player casino game available to players. The most common game of slots is found in a simple three-reel slot machine. Each reel of the slot machine has, say, 30 indexed positions, some or all of which may display a corresponding indicium. A player of the slot machine is required to place a wager on an outcome of the casino game by introducing coins, tokens or credit into the slot machine, which then enables each of the three reels to be spun and to come to rest at any of the indexed positions. An outcome of the game is determined as a function of a combination of the three resulting indexed rest positions. Several outcomes of the game usually result in the player being awarded corresponding prizes, one particular outcome causing the player to win a jackpot prize. A slot machine with the particular characteristics described above has a jackpot cycle of 27,000, which means that, on average, 27,000 outcomes of the game must be determined in order for the jackpot to be won by the player.

The three-reel slot machine described above may be a free-standing electro-mechanical or electronic machine suitable for use in a land-based venue, or may, alternatively, be an on-line implementation, where the three reels of the slot machine are simulated on a display monitor, while an outcome of the game is derived from a random number generator implemented in software. An advantage of such single-player games is that of rapid play and the immediacy of a result in a turn of a game.

A version of slots, known as "Pachislo" or Japanese slots, is an alternative to three-reel American slot machines. Pachislo is played using special purpose gaming machines that are found in Japanese casinos and Pachislo parlors. In such machines, there is no pull bar, as there is in American-style slot machines. Rather, a toggle bar is provided on the front of the machine to engage the reels. As the reels spin, they can be stopped by the player pushing a button directly below each reel. This feature adds an element of skill rather than chance to the operation. Prior art of interest disclosing Pachislo type gaming devices includes U.S. Pat. Nos. 6,439,994 and 5,421,576.

In Japanese casinos and Pachislo parlors, different slot machines in the parlor that play the same slots games are generally set up to have a range of different payout percentages. In particular, some machines are characterised as being "loose" with a payout of 120%, while others are characterized as being "tight" with a payout of 85%, and still others having a range of payout percentages in between the two extremes. A payout percentage of 100% indicates that, over the long term, the machine pays out winnings in equal proportion to the amount wagered using the machine, whereas a payout percentage of 85% means that, over the long term, the machine pays out winnings at a rate of 85% of the amount wagered, indicating that the casino operator achieves revenue of 15% of the amount wagered at that machine.

In Japan, the casino operators alter the payout percentages of the Pachislo machines on a regular basis, usually daily or twice daily. The fact that there are identical machines with differing payout percentages is known and is publicized. A player who walks up to a particular machine to play does not know up-front whether the machine he has chosen will be "loose" or "tight." Players accept that part of the excitement is finding a machine that is "loose." The player will only be able to judge the payout characteristic of the machine during or after the player's playing session. Players are attracted by the prospect of selecting a slot machine to play that has a high payout percentage.

SUMMARY

Methods are described herein which provide a way of implementing variable payout games in an environment where a gaming workstation communicates with a central gaming server. One such environment is an online environment wherein the workstation communicates with a gaming server over a computer network such as the Internet. Another environment is a casino environment, wherein the gaming workstation communicates with a central gaming server over a local area network.

In a first aspect, a method of facilitating play of a variable payout game on a workstation having a display is provided. The method includes a step (a) of making an initial determination of a payout percentage for an instance of the variable payout game at a gaming server. Such determination may be made for example when the player logs onto a casino website and makes an initial selection to play an instance of the game. The initial payout percentage that is determined is preferably determined randomly, and may take into account weightings of various predetermined payout percentages as explained in detail herein.

The method includes a step (b) of generating one or more results of turns of play of the variable payout game instance at the gaming server, in accordance with the initial determination of a payout percentage, and transmitting the result(s) of play to the workstation. For example, the gaming server may execute software code representing an instance of video slots and determine the results of the virtual spins of the slots wheels by means of a random number generator. Techniques of determining outcomes of a turn of a variable payout game are disclosed herein, e.g., using a weighting method as described in further detail below. The results of the turn are communicated from the gaming server to the workstation, e.g., over a computer network such as the Internet or a local area network.

In one embodiment, the method further includes a step (c) of performing, at the gaming server, a dynamic re-determining of the payout percentage for the instance of play. Such re-determining can be triggered by one of several possible events, such as the expiration of a certain amount of time T (e.g., ½ hour, where T is a configurable parameter). As another example, the trigger could be the completion of N turns of play, where N is a configurable parameter, and an integer greater than or equal to 1, e.g., between 1 and 1000 inclusive. For example, suppose the player received an initial payout percentage of say 95%. After 100 turns of play have occurred (N=100), the gaming server randomly assigns a new payout percentage for the game instance, say 105%. The re-determination of the payout percentage can be made in accordance with the same procedure that the initial determination of a payout percentage was made.

In this particular embodiment, the method further includes a step (d) of generating one or more further results of turns of play of the variable payout game at the gaming server in accordance with the re-determination of the payout percentage and transmitting the further result(s) of play to the workstation.

In one embodiment, there are a set of M predetermined available percentage payouts for an instance of the game, e.g., 6 different payout percentages, namely 95%, 97%, 99%, 101%, 105% and 110% (M=6). The step of determining the initial payout percentage in step (a) and the re-determination of the payout percentage in step (c) comprises a random selection of one of the M predetermined available percentage payouts. M is an integer greater than or equal to 2.

In a further refinement of this embodiment, each of the M predetermined available percentage payouts for an instance of the game are associated with a weighting factor. The assignment of particular weighting factors to the payout percentages is a configurable parameter and may vary depending on the "flavor" the proprietor of the game wishes to give to the game, the desired profit margin, etc. For example, the 95% percentage payout may be weighted more heavily than the remaining payouts, such that in the determining steps (a) and (c) the server is most likely to select this payout percentage in a random selection process for selecting payout percentages. Similarly, the payout percentages of 101%, 105% and 110% are progressively weighted less, such that they are less likely to be selected in a random selection process. The random selection of one of the M predetermined available percentage payouts in steps (a) and (c) occurs with reference to the weighting factors. Various algorithms for selection of a payout percentage using the weighting factors can be devised, one of which is described in detail below.

In an embodiment in which the server re-determines a payout percentage after N turns of play have elapsed, the value of N to trigger a re-determination of the payout percentage need not necessarily be the same for all the available payout percentages. For example, if the workstation was initially assigned to a 95% payout percentage, re-determination of the payout percentage in step (c) may be triggered after say 200 turns (N=200). If the workstation was initially assigned to a 110% payout percentage, a re-determination of the payout percentage could be triggered after say 100 turns (N=100). The values of N could be randomly determined for each of the payout percentages, alternatively they could vary from instance to instance of the game, or they could be the same for all instances of the games and the same for all of the different available payout percentages.

As noted above, in one embodiment, the gaming workstation comprises a computing device such as a general purpose computer or portable wireless-computing device which engages in online gaming with a central gaming server over a computer network such as the Internet. In another embodiment, the gaming workstation could be an electronic gaming terminal located in a casino which communicates over a local area network with a central gaming server serving all the video gaming terminals in the casino.

In one embodiment, the variable payout game comprises a slots game, such as, for example, conventional video slots or Japanese-style Pachislo slots. In other embodiments, the variable payout game comprises an electronic scratch ticket game. In such a game, the player is presented with an array of icons in a play area which simulates a traditional paper scratch ticket. The icons conceal a potentially winning indicium such as a prize, token, lucky number, etc. The player simulates scratching off one or more of the icons. If the prize, token, number etc. that is subsequently revealed contains a winning indicium, the player "wins." The variable payout feature is implemented by changing the probability that the icons on a given scratch ticket comprise one or more winning indicia.

In one possible variation of the game, particularly in the video slots embodiment, the central gaming server transmits to the workstation the results of a second instance of a variable payout game occurring substantially simultaneously on a second workstation. For example, there may be multiple workstations playing variable payout slots simultaneously. The central gaming server transmits a datagram to the gaming workstation containing not only the results of play on their own instance, but also the results of play on the instance played by the other workstation (and vice versa, the second workstation receives the results of play of their workstation and of the first workstation). Accordingly, the workstation may simultaneously display the results of play of the instance of the variable payout game being engaged in by both the workstation and by the second workstation. This feature can simulate a real casino environment where players can see what is going on on other slot machines while they play their own game.

In another aspect, a central gaming server facilitating play of a variable payout game on a workstation is provided. The server comprises a processor and a software process coded as a set of instructions for execution by the processor. The software process causes the gaming server to perform the following functions:

(a) making an initial determination of a payout percentage for an instance of the variable payout game; and (b) generating one or more results of turns of play of the variable payout game instance in accordance with the initial determination of a payout percentage and transmitting said result(s) of play to the workstation.

In one embodiment, the gaming server software process causes the gaming server to perform the following additional functions:

(c) dynamically re-determining the payout percentage for the instance of play; and (d) generating one or more further results of turns of play of the variable payout game in accordance with the re-determination of the payout percentage and transmitting said further result(s) of play to the workstation.

As noted above, the central gaming server can be one serving remotely located workstations communicating with the gaming server via a computer network such as the Internet or a local area network.

A still further aspect of the invention resides in a gaming workstation for playing a variable payout game. In one embodiment, the gaming workstation communicates with a central gaming server, e.g., over a network. In this embodiment, the gaming workstation includes a display, a processing unit, and a memory storing a gaming application for execution by the processing unit. The gaming application comprises a set of instructions for performing three tasks: (a) it communicates with a central gaming server to receive datagrams containing outcomes of play of a variable payout game, the outcomes of play in accordance with an initial determination of a payout percentage for the variable payout game; (b) it presents the outcomes of play on the display of the workstation; and (c) it provides data to the central gaming server for use in re-determining a payout percentage for the game instance. Such data may comprise at least one of: (i) the elapsed time of play of the variable payout game; (ii) the number of consecutive instances of play of the variable payout game occurring using the workstation; (iii) the length of time elapsed since a turn of play occurred on the workstation; and (iv) a log-on or log-off event occurring on the workstation. For example, the length of time elapsed since a turn of play occurred can indicate that the player has stopped playing and left the workstation. A log off or log on event also may indicate that the player has stopped playing. The data provided by the workstation to the gaming server in aspect (c) of the application may be used by the gaming server to automatically re-determine a payout percentage for the variable payout game.

In another embodiment, the workstation does not communicate with a central gaming server in order to determine results of play. Rather, the functionality of the central gaming server is resident in the gaming workstation. In this embodiment, a gaming workstation for playing a variable payout game is provided comprising a display, a processing unit, and a memory storing a gaming application for execution by the processing unit. The application performs three functions: (a) it determines outcomes of play of the variable payout game in accordance with an initial determination of a payout percentage for the variable payout game; (b) it presents the outcomes of play on the display; and (c) it re-determines a payout percentage for the variable payout game based on at least one of: (i) the elapsed time of play of the variable payout game; (ii) the number of consecutive instances of play of the variable payout game occurring using the workstation; (iii) the length of time elapsed since an instance of play occurred on the workstation; and (iv) a log on or log off event occurring on the workstation.

The re-determination of payout percentages can be performed using the features described previously. For example, they can be made using a set of predetermined payout percentages, application of weighting factors to the different payout percentages, and application of a random selection process taking into account the weighting factors.

One specific example of a gaming workstation which includes these features is a gaming workstation installed in a casino environment. Such workstation may implement a video slots or electronic scratch ticket type game.

In still another aspect, a method of facilitating play of a variable payout game on a workstation having a display is provided which uses log-off activity as a trigger to change a payout percentage for a variable payout game played on the workstation. The method addresses the situation where a player realizes that they are playing an instance of the game that is relatively "tight" and performs a log-off or other exit action to terminate the instance of the game and then logs back on or otherwise reinitiates an instance of the game to hopeful connect to a game instance that is "loose." In this aspect, the gaming server determines anew the payout percentage for the new game instance when the player logs back on to the game. The gaming server generates one or more results of turns of play of the variable payout game in accordance with the new determination of the payout percentage, and transmits the further result(s) of play to the workstation.

In addition to the exemplary aspects and embodiments described above, further aspects and embodiments will become apparent by reference to the drawings and by study of the following detailed descriptions.

BRIEF DESCRIPTION OF THE DRAWINGS

Embodiments of the invention are described below, by way of example only, and with reference to the abovementioned drawings, in which:

FIG. 6 also illustrates a scrolling display of the results of the instances of the single-player game and a chat feature whereby the players may exchange instant messages.

DETAILED DESCRIPTION

Overview of Networked Gaming Environment

Figure 1:
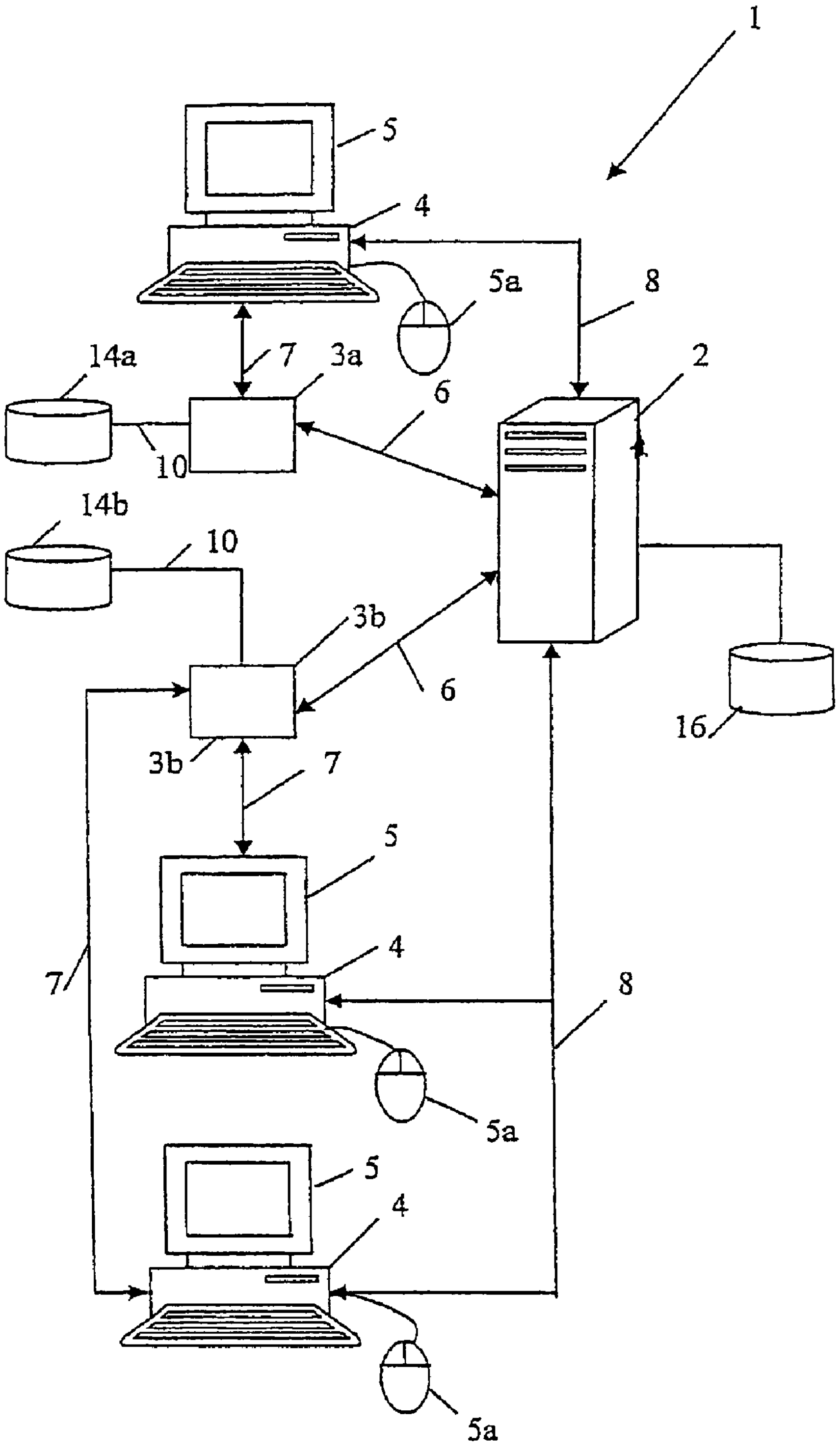
FIG. 1 is functional diagram of an on-line gaming system in which a remotely located computer workstation communicates with a central gaming server in the course of play of a variable payout game.

Referring to FIG. 1, a gaming system suitable use in variable payout games of this disclosure is indicated generally by reference numeral (1). The gaming system (1) includes a central gaming server (2), and a number of portals (3*a*, 3*b*) in the form of portal websites on the World Wide Web of the Internet. In this embodiment, each one of the portal websites is an online casino website hosted on a corresponding casino web server (not shown). For convenience, this particular embodiment of the invention will be described with particular reference to only two such online casino websites (3*a*, 3*b*). Other online casino websites may be present, or, alternatively, just one casino website may be present.

Each one of the online casino websites (3*a*, 3*b*) is accessible by a would-be player (not shown) through a player gaming workstation (4) in the form of an Internet-enabled computer workstation having a display monitor (5) and an associated pointing device (5*a*) such as a mouse or, alternatively, a touchpad. In this embodiment, online casino website (3*a*) is shown as having one computer workstation (4) logically connected thereto, whereas casino website (3b) is shown as being logically connected to two computer workstations (4). It will be appreciated by those skilled in the art that such online casino websites (3a, 3b) can be logically connected to any desired number of such computer workstations (4) simultaneously, which number is physically limited only by considerations of processing power and Internet access bandwidth.

The gaming server (2), the online casino web servers (not shown) corresponding to the online casino websites (3a, 3b), and the computer workstations (4) are capable of communicating with each other by means of an open communication network that is, in this embodiment, the Internet. The Internet is represented in FIG. 1 as separate logical communication networks (6, 7, 8, 10). The particular networking topology used and presence of intermediate networks or switching equipment is not important, and may make use of intervening communications network such as the public switched telephone network, cable networks, cellular wireless networks, WiFi, WiMax, etc.

The online casino websites operate a clearing account facility (14a, 14b) with a credit account corresponding to each player who participates in a game offered by the online casino. In the illustrated embodiment, therefore, the credit account facility (14a) has one player credit account associated with it, while credit account facility (14b) has two associated, but separate, player credit accounts.

A stored workstation program (not shown) is resident in the client computer workstation (4) which enables a participating player to place a wager on a turn of the variable payout game. The stored application includes display tools for displaying on the user interface display (5) gaming symbols (e.g., slot machine reels or virtual scratch-type tickets), gaming controls by which the player can place wagers, spin the reels, "scratch" the ticket, etc., and the results of play. The application also includes gaming logic for facilitating the execution of a turn of a game, and communications facilities for communicating player actions using the user interface to the central gaming server, and receiving datagrams from the gaming server containing results of play. The data representing results of play is translated to graphical symbols which are presented on the user interface display (5).

Each computer workstation (4) may take the form of a conventional personal computer operating under a Windows XP, ME, 2000 or other operating system, which is well known and commercially available from the Microsoft Corporation of Redmond, Wash., or other operating system such as provided by Apple Computer or a Linux operating system. The gaming workstation may also take the form of a portable computing device such as personal digital assistant or cellular telephone. The gaming workstation may also take the form of an electronic gaming terminal.

A stored program in the gaming server (2) maintains a dynamic register (16) of all players admitted to, and actively participating in, all the instances of the variable payout games from time to time. The dynamic register (16) also contains data representative of an instance of the game in which the player is participating. An administration facility (not shown) settles the wagers of the participating players after completion of every turn of any instance of the game. The gaming server (2) operates, for example, under the Windows NT operating system.

The stored workstation program or application (not shown) and the corresponding stored server program will be referred to, for convenience, as a client process and a server process, respectively. The server process generates one or more random events that determine the outcome of the variable payout game, such as determining the outcomes of spins of the slot machine reels in the various slots games of the participating players. The client process of any particular computer workstation (4) obtains the result of the random events from the gaming server (2) along the communication network (8) and displays the outcome of the game on the display monitor (5) of the workstation in an intelligible manner, by causing the player's set of slots reels to spin and to come to rest at a position corresponding to the outcome.

In order to play the variable payout games from any particular computer workstation (4), the client process (not shown) must first be downloaded to that computer workstation from the gaming server (2) or, alternatively, from a separate web server (not shown), and then installed on the workstation.

In use, a player wishing to participate in the game of variable payout games uses a computer workstation (4) to access an online casino website (3a, 3b) of his choice. The player is presented with an icon (not shown) on the GUI on his computer workstation (4), which the user can activate in order to request participation in the variable payout game(s). The user's request for participation is passed by the online casino website (3a, 3b) to the gaming server (2), which makes it available for download by the client application.

The online casino websites may be provisioned as a virtual slots room where slots is the only game available to would-be players rather than one where a variety of different games are offered to a player.

It will be noted again that a system implementing the methods of this invention need not include two (or more) separate casino websites (3a, 3b), and that only one website (3) may be linked to the gaming server (2).

Methods of Play of Variable Payout Games

Figure 2:
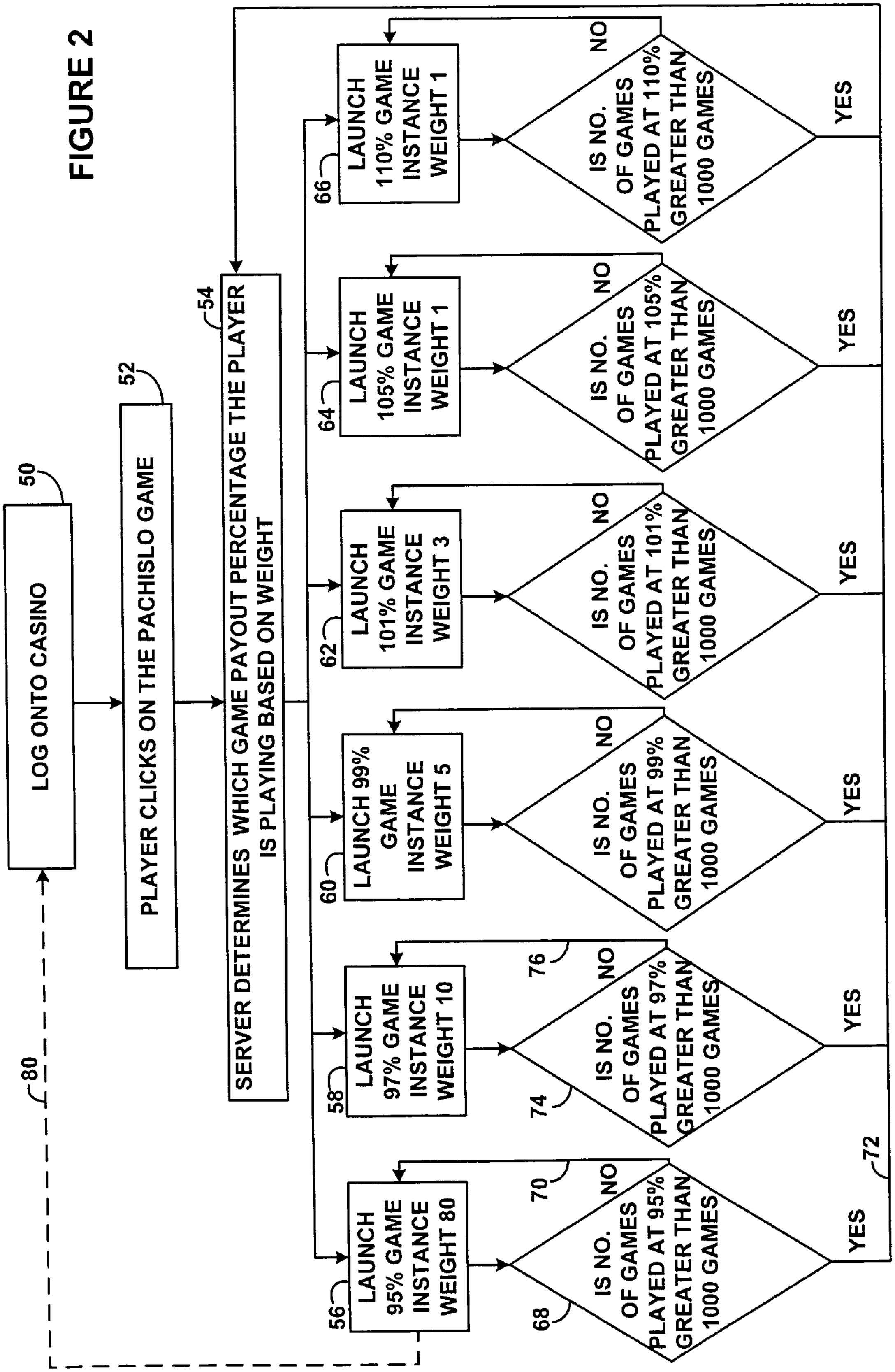
FIG. 2 is a flow chart showing a method by which the central gaming server makes an initial determination of a payout percentage for an instance of the game played by one of the computer workstations of FIG. 1, and re-determines the payout percentage for the game instance after a configurable number of turns of the game have occurred.

A method of facilitating play of a variable payout game on a workstation having a display will now be discussed with reference to FIG. 2. FIG. 2 is a flow chart showing a method by which the central gaming server (2) of FIG. 1 makes an initial determination of a payout percentage for an instance of the game played by one of the computer workstations of FIG. 1, and re-determines the payout percentage for the game instance after a configurable number of turns of the game has occurred.

At step 50, the workstation (4) of FIG. 1 logs onto a casino website (3a) or (3b). This step may also include a download step whereby the workstation (4) downloads a client process described herein for playing variable payout games, such as a slots or an electronic scratch ticket-type game. This client process will include the graphics tools, application logic for executing a turn of the game, and communications utilities for transmitting datagrams to the gaming server (2) and receiving datagrams from the server (2) containing results of turns of play.

At step (52), the player is presented with a menu of games available for play on the casino and selects a variable payout game to play, e.g., with a click of the mouse, thereby prompting initiation of an instance of the game. In this example, the game is a Pachislo slots game (or other variable payout game). A datagram is sent from the workstation to the gaming server indicating the player selected a variable payout game for play.

At step (54), the gaming server (2) receives the datagram resulting from step (52) and launches an instantiation of the variable payout game and makes an initial determination of a payout percentage for the instance of the variable payout game selected by the player. The initial payout percentage that is determined is preferably determined randomly. Every player that plays the game plays a separate instance of the game. Each instance of the game has a corresponding initial payout percentage that is determined. In FIG. 2, for example, an instance of the game can have one of six different payout percentages, namely 95%, 97%, 99%, 101%, 105% and 110%. When a player launches an instance of the game by clicking the icon on the games menu (step 52), the gaming server (2) selects randomly the payout percentage that will apply to that particular instance of the game. This is done "in the background", without the player being aware that this step is occurring. To summarize, in the illustrated embodiment there are a set of M predetermined available percentage payouts for an instance of the game, e.g. in FIG. 2, six different payout percentages, namely 95%, 97%, 99%, 101%, 105% and 110% (M=6). The step of determining the initial payout percentage comprises a random selection of one of the M predetermined available percentage payouts. M is an integer greater than or equal to 2.

In the example of FIG. 2, the initial selection of one of the M available percentage payouts is done by taking into account weightings assigned to the M predetermined payout percentages. The weighting assigned to each of the available percentage payouts can be considered as the probability that a random number generated by the central gaming server (2) will select the given percentage payout. The weights can be shown as a probability distribution table, for example as shown in Table 1:

TABLE 1

| PAYOUT (%) | Probability |
|---|---|
| 95 | 0.8 |
| 97 | 0.1 |
| 99 | 0.05 |
| 101 | 0.03 |
| 105 | 0.01 |
| 110 | 0.01 |

One method for selecting the initial payout percentage is as follows. The gaming server (2) generates a random number between 1 and 100. The method by which the random number is generated is not particularly important. Numbers randomly generated in the range of between 1 and 80 inclusive are assigned to the 95% payout percentage, numbers in the range of 81-90 inclusive are assigned to the 97% payout percentage, numbers between 91 and 95 inclusive are assigned to the 99% payout percentage, numbers between 96 and 98 inclusive are assigned to the 101% payout percentage, the number 99 is assigned to the 105% payout percentage and the number 100 is assigned to the 110% payout percentage. For example, if the random number generated by the server is a 46, the initial payout percentage is 95%. If the random number is 98, the payout percentage is 101%, and so forth.

Once the initial payout percentage is determined in block (54), the process proceeds to launching of one of the available game instances (56), (58), (60), (62), (64) and (66). The method includes a step (b) of generating one or more results of turns of play of the variable payout game instance at the gaming server in accordance with the initial determination of a payout percentage, and transmitting the result(s) of play to the workstation. For example, the gaming server (2) may execute software code representing an instance of video slots and determine the results of the spins of the slots wheels by means of a random number generator. Techniques of determining outcomes of a turn of a variable payout game are disclosed herein, e.g., using a weighting method as described in further detail below. The results of the turn are communicated from the gaming server (2) to the workstation (4), e.g., over a computer network such as the Internet. For example, if the random number indicated that the payout percentage is 95%, an instance of the game with a 95% payout is launched as indicated at (56). Game play proceeds. The gaming server (2) generates events for successive turns of the game instance using a random number generator and transmits datagrams to the workstation (4) with the results of play.

Play continues either until the player terminates the playing session (for example, by selecting another game to play or by quitting the game and logging out from the online casino) or until the player has played a predetermined number ("N") of turns of the game (for example, 1000 turns in FIG. 1), whichever is the earlier. This is indicated in block (68), and the no branch returning to continued play of the game if less than 1000 turns have occurred.

In one embodiment, the method further includes a step (c) of performing, at the gaming server (2), a dynamic re-determining of the payout percentage for the instance of play. At step (68), once the predetermined number (N) of turns of the game has been reached, the processing reverts back to block (54) as indicated by the arrow (72). At step (54), the gaming server (2) once more determines randomly the payout percentage that will apply to that particular instance of the game going forward, for example, using the same weighting method and a random number generator. The new payout percentage will apply immediately as from the next turn of the game.

The purpose of loop (72), (54) is to prevent undue advantage to the player should the player become aware that the particular instance of the game that the player is currently playing has a high percentage payout (in other words, the good luck times do not last forever). Furthermore, if the player plays a machine that is "tight", it offers hope that a re-determination of the payout percentage will be more favorable.

In this embodiment, the method further includes a step (d) of generating one or more further results of turns of play of the variable payout game at the gaming server in accordance with the re-determination of the payout percentage, and transmitting the further result(s) of play to the workstation. For example, after the process (54) executes for a second time, a new game instance is launched (56)-(66) depending on the results of the random number generated at process (54). The gaming server (2) generates new outcomes at the new instance and sends the results to the workstation (4) for display.

The weighting factors assigned to the payout percentages (Table 1) are configurable parameters and can vary depending on the flavor the proprietor wishes to give to the game. Furthermore, there may be more (or fewer) categories of percentage payouts. Furthermore the value of N triggering a re-determination of the percentage payout is also as configurable parameter. It takes the form of an integer greater than or equal to 1. For example, it may take on a value of between 1 and 1000. Note further that the value of N can be the same for each of the payout percentages (N=1000 in FIG. 2 for each instance). Also note that N can vary from one instance to another. For example, while the 97% payout percent game instance (58) also reverts to a re-determination of the payout percentage after 1000 turns (block 74), this could be otherwise, such as, for example, N could be 200 or 500 for the 95% payout instance.

In FIG. 2, dashed line 80 indicates a log-off event. In the event that the player logs off of the game (such as by clicking on "Exit") or performs some other analogous operation to terminate the instance of the game, a datagram indicating termination of the instance eof the game is sent to the gaming server (2). The player is taken back to the home page of the casino and presented with a menu of available games to play. Suppose the player clicks on the Pachislo icon again (step 52), whereupon a datagram is sent to the gaming server indicating the player wishes to initiate a new instance of the game. The gaming server (2) launches a new instance of the game and determines anew a percentage payout for the new instance of the game (steps (54) and (56/68/60/62/64) or (66)). The method addresses the situation where a player realizes that they are playing an instance of the game that is relatively "tight" and uses a log-off or other action to exit out of or otherwise terminate the instance of the game and then logs back on or takes other action to initiate a new game to hopefully connect to a game instance that is "loose."

In this embodiment, a method of facilitating play of a variable payout game on a workstation having a display includes the steps of: (a) at a gaming server, making an initial determination of a payout percentage for an instance of the variable payout game (step (54) of FIG. 2); (b) generating one or more results of turns of play of the variable payout game instance at the gaming server in accordance with the initial determination of a payout percentage and transmitting said result(s) of play to the workstation (launching of an instance of the game (56)-(66); (c) terminating the instance of the game, such as by receiving a datagram at the gaming server indicating that the player using the workstation has logged off of the game (dashed line (80)), (d) commencing a new instance of the game, such as by receiving a datagram at the gaming server indicating that the player using the workstation has logged back on to the game (step (52), player re-clicks on the game icon); (e) determining anew the payout percentage for the instance of play (step (54)); and (f) generating one or more further results of turns of play of the variable payout game at the gaming server in accordance with the re-determination of the payout percentage and transmitting said further result(s) of play to the workstation (new launching of an instance (56)-(66)). Note further that, prior to logging out (action (80), the process of FIG. 2 and in particular the loop (72) and (54) may execute, wherein a new payout percentage may occur prior to receipt of the log-off datagram. Such re-determination of the payout percentage may occur based on the number of turns of the instance of the game, or other triggering event.

Figure 3:
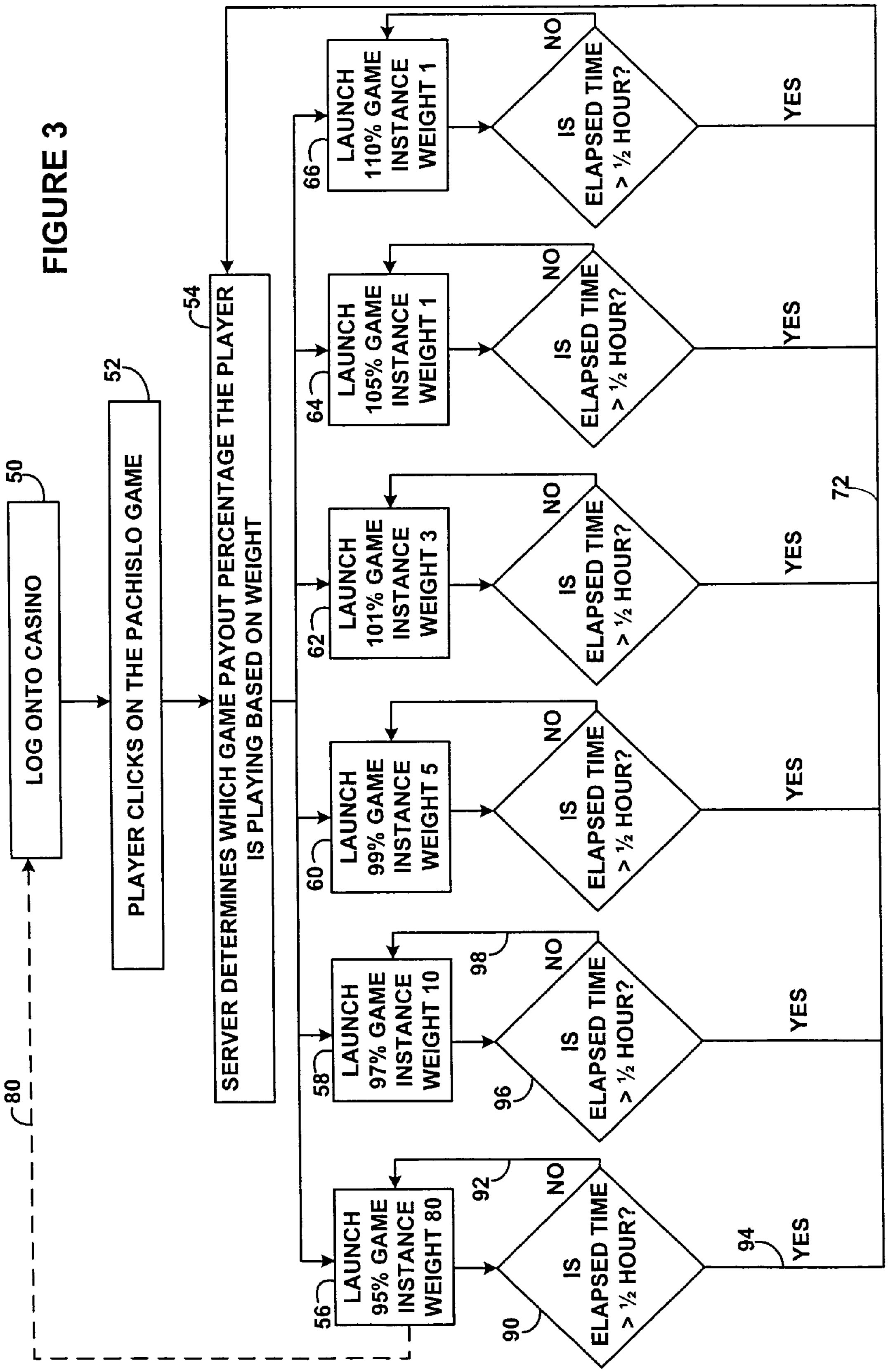
FIG. 3 is a flow chart showing a method by which the central gaming server makes an initial determination of a payout percentage for an instance of the game played by one of the computer workstations of FIG. 1, and re-determines the payout percentage for the game instance after a configurable amount of time has elapsed.

While FIG. 2 uses the number of turns as a triggering event to re-determine a payout percentage, and a log-off can be another triggering event, still other triggering events are possible. One such triggering event is the expiration of a certain amount of time T after play commences on a given game instance (e.g., T=½ hour, where T is a configurable parameter). This variation is shown in FIG. 3. Steps (50)-(66) are the same as for FIG. 2. However, as play is ongoing, a process (90) determines whether the elapsed time since the game instance was launched is greater than ½ hour. If no, play continues (No branch 92). If the elapsed time is greater than ½ hour, then the process reverts back to step (54). A similar process occurs for the 97% instance as indicated by block (96), the no branch (98) and the arrow (72) leading back to block (54). Similar processes occur in the other game instances (60)-(66). Note further that the parameter T need not be the same for each payout percentage. For example, T could be 1 hour for the 95% payout instance, and thirty minutes for the 110% payout game instance.

As mentioned previously, the variable payout game can take several forms, such as a slots game and an electronic scratch ticket type game. Consider first the slots type game first. The following example is provided by way of example and is simplified somewhat for ease of understanding of the principles involved. Each reel of a virtual or electronic slot machine may contain some predetermined number of independent symbols, such as BAR, CHERRY, LEMON, LUCKY 7, BAR, BAR BAR, BAR BAR BAR, BLANK (or SPACE), and so forth. There is a weighing or probability assigned to each of the symbols, which reflects the likelihood that a given "spin" of the reel will result in a particular symbol being displayed. For example, the probabilities for a 95% game instance might be as follows:

TABLE 2

| Symbol | Weight | Random number value(s) (inclusive) |
|---|---|---|
| BLANK | 0.40 | 1-40 |
| CHERRY | 0.30 | 41-70 |
| LEMON | 0.13 | 71-83 |
| BAR | 0.10 | 84-93 |
| BAR BAR | 0.04 | 94-97 |
| BAR BAR BAR | 0.02 | 98-99 |
| LUCKY 7 | 0.01 | 100 |

A spin of the virtual slot machine reel thus consists of a generation of a random number of between 1 and 100 and comparison of the resulting number to TABLE 2 in order to determine the resulting symbol to display. This process occurs in parallel for each of the reels in the set for the given instance of play. The game of slots has a pay table associated with it which indicates the payout for particular results appearing on the sets of reels, e.g., LEMON LEMON LEMON pays out at 3 to 1.

For each game instance at 95%, 97%, 99%, 101%, 105% and 110%, the gaming server (2) process basically assigns different probabilities to the particular symbols, essentially varying the weight to be attributed to each symbol in FIG. 2. Persons skilled in the art will be able to develop an appropriate set of weights in accordance with the principles of this disclosure and methods already known in the art.

As a variation on this method, consider a three reel slot machine game with 30 positions per reel. The gaming server (2) may store a table that groups integers between say 1 and 27,000 into different categories, each category associated with a given payout or result in accordance with the pay table for the game instance. For example, the numbers 1-22,500 may be associated with no payout (the player did not win in that turn), and numbers 22,501-27,000 associated with different winning results, with the number 27,000 reserved for the jackpot. Thus, the available overall results are weighted in the same fashion as explained above, instead of individual symbols. The gaming server (2) randomly generates a number between 1 and 27,000, and determines what the result is by reference to the table. The gaming server (2) sends just the result to the workstation, and the client application in the workstation constructs a reel set which corresponds to the result provided to it by the gaming server. For example, the random number generated is 22,822, which indicates a payout of 3 to 1. The gaming server provides data indicating a result of 3 to 1 for the turn of the game to the client application. The client application game logic constructs a reel set showing LEMON LEMON LEMON, where this pattern of symbols is the pattern that is associated with a 3 to 1 win in accordance with the game's paytable. As another example, the gaming server randomly generates the number 19,249. The table indicates that this is a "no win" result. The gaming server provides the client process with data indicating a "no win" result. The client application randomly generates a set of reel results that do not result in a win in accordance with the paytable, e.g., SPACE CHERRY SPACE, or LEMON SPACE BAR.

Of the two methods, the latter method (sending just a result and letting the client application generate the results to display on workstation user interface) is considered more preferred in that it at least potentially off-loads some of the processing required to generate and display results from the gaming server process onto the client application. The goal here is to have the game server perform as little game instance processing as possible (since it is handling potentially hundreds or thousands of game instances at a time) and to off-load as much of the game instance processing as possible onto the client application.

Consider further the scratch ticket-type game. In such a game, the player is presented with an array of icons, e.g., a 3×3 array of icons in a play area which simulates a traditional paper scratch ticket. One or more of the icons conceal a potentially winning indicium such as a prize, token, lucky number, etc. The player simulates scratching off one or more of the icons, e.g., using a computer pointing device. If the prize, token, number, etc. that is subsequently revealed contains a winning indicium, the player "wins." The variation in the payout percentage is implemented by changing the probability that the area of play comprising all the icons contains one or more winning indicia. For example, in a 95% payout game, the player gets to scratch 2 icons, there are 9 icons total, and if they scratch an icon that reveals the one type of winning token they win ten times the amount wagered, and if they scratch an icon that reveals a second type of winning token they win at one hundred times the amount wagered. The probability that the first token is present in the array is X and the probability that the second token is present in the array is Y (with X and Y determined according to statistics taking into account the number of icons and the paytable). The 97% payout game and other percentage payout games basically modify the weighting assigned to probabilities X and Y. For each turn of the game instance, the gaming server (2) generates nine random numbers between say 1 and 100 and such numbers are used to determine whether the icons in the 3×3 array contain the winning indicium or tokens, given the probabilities X and Y.

Using the features of this disclosure, the gaming server (2) makes an initial determination of the payout percentage for the scratch-type game, generates turns of play, and then in response to a triggering event re-determines the percentage payout and generates new results for subsequent turns of the game. The triggering event could be the same types as for the slots game, such as completion of N turns, the elapsing of time period T, logging off of the game, or other.

Casino Embodiment

Figure 4:
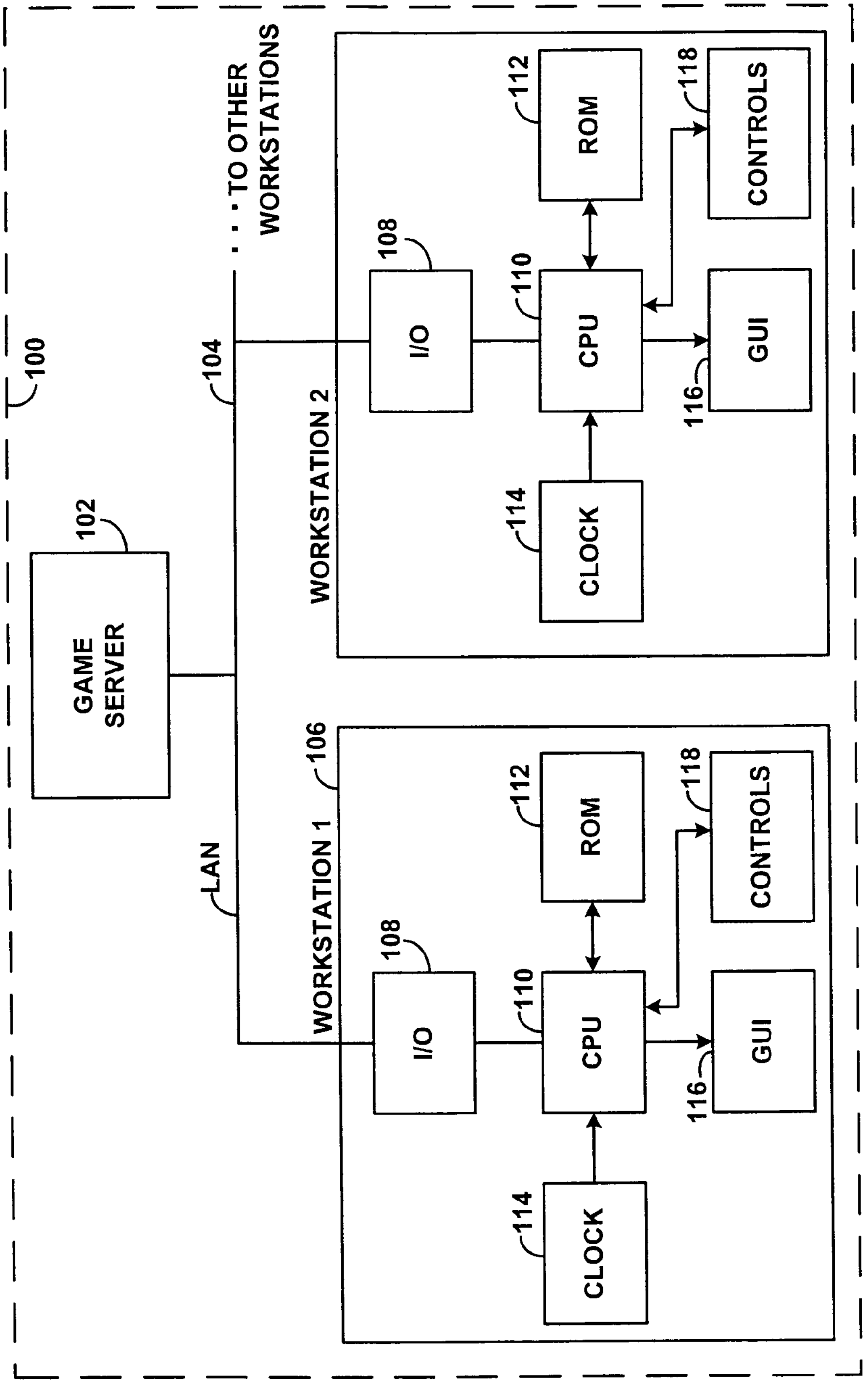
FIG. 4 is a block diagram of a casino environment in which a gaming server is connected over a local area network to a plurality of gaming terminals, in which the gaming server determines the payout percentage for instances of games played on the terminals, e.g., in accordance with the method of FIG. 2 or FIG. 3.

The principles of this disclosure are applicable to a workstation installed in a casino environment. In one casino embodiment, the workstation communicates over a local area network to a central gaming server. This arrangement is shown in FIG. 4. The casino (100) includes a computer system including a gaming server (102) and a local area network (104) which couples the gaming server (102) to a plurality of workstations (106). The workstations may take the form of electronic video gaming terminals. Such workstations (106) include input/output circuitry (108) comprising an interface to the local area network (104), a central processing unit (110) executing a gaming application (client process described herein), read only memory (112) storing program instructions (client process), a clock (114), a graphical user interface (116) (display), and gaming controls (118) such as buttons, levers, etc. The particular construction and arrangement of the video gaming terminals or workstations (106) is not critical.

In one embodiment, the operation of the terminals to play an instance of a variable payout game is the same as described above—the workstation (106) displays results of turns of play and the gaming server (102) executes a server process that determines an initial payout percentage and then re-determines the payout percentage when a triggering event occurs, such as elapsing of time period T during play of the game or the execution of N turns on the workstation.

Alternatively, the gaming server (102) can take advantage of the clock (114) and in particular the amount of time that has elapsed since a given turn of the game has occurred. Suppose, for example that player played fifty turns of the game on the workstation (106) and then walked away. Twelve minutes elapses and then another player sits at the machine and starts to play. The amount of time that elapses during a period of inactivity at the workstation (106) can be used as a triggering event. This amount of time can be a configurable parameter and could be, for example, ten minutes, ½ hour, etc. While FIG. 4 shows the use of a clock (114) in the workstation as a means to identify the amount of time that has elapsed during a period of inactivity, such tracking of time could also occur via a clock in the gaming server (102) which provides input to a state machine representing an instance of the game executing on the workstation (102).

In summary, in still a further aspect of the invention a gaming workstation (106) is provided for playing a variable payout game. In one embodiment, the gaming workstation (106) communicates with a central gaming server (102), e.g., over a network (104). In this embodiment, the gaming workstation includes a display (116), a processing unit (110), and a memory (112) storing a gaming application for execution by the processing unit. The gaming application comprises a set of instructions for performing three tasks, as described herein: (a) it communicates with a central gaming server (102) to receive datagrams containing outcomes of play of a variable payout game, the outcomes of play in accordance with an initial determination of a payout percentage for the variable payout game; (b) it presents the outcomes of play on the display (116) of the workstation; and (c) it provides data to the central gaming server (102) for use in re-determining a payout percentage for the game instance. Such data may comprise at least one of: (i) the elapsed time of play of the variable payout game; (ii) the number of consecutive instances of play of the variable payout game occurring using the workstation; (iii) the length of time elapsed since a turn of play occurred on the workstation; and (iv) a log-on or log-off event occurring on the workstation. For example, the length of time elapsed since a turn of play occurred can indicate that the player has stopped playing and left the workstation. A log-off or log-on event also may indicate that the player has stopped playing. The data provided by the workstation to the gaming server in aspect (c) of the application may be used by the gaming server (102) to automatically re-determine a payout percentage for the variable payout game.

In another embodiment, the workstation does not communicate with a central gaming server in order to determine results of play or determine a payout percentage. Rather, the functionality as represented by the server process described above (generating outcomes for turns of the game, determining an initial payout percentage, and re-determining payout percentage in response to a trigger event) is resident in the gaming workstation (106). In this embodiment, a gaming workstation for playing a variable payout game is provided comprising a display (116), a processing unit (110), and a memory (112) storing a gaming application for execution by the processing unit. The application performs three functions: (a) it determines outcomes of play of the variable payout game in accordance with an initial determination of a payout percentage for the variable payout game; (b) it presents the outcomes of play on the display (116); and (c) it re-determines a payout percentage for the variable payout game, e.g., as shown in FIGS. 2 and 3 by loop consisting of arrow (72) and block (54). Such re-determination of the payout percentage is based on at least one of: (i) the elapsed time of play of the variable payout game (FIG. 3), (ii) the number of consecutive instances of play of the variable payout game occurring using the workstation (FIG. 2), (iii) the length of time elapsed since an instance of play occurred on the workstation (using the clock (114)), and (iv) a log-on or log-off event occurring on the workstation.

Figure 5:
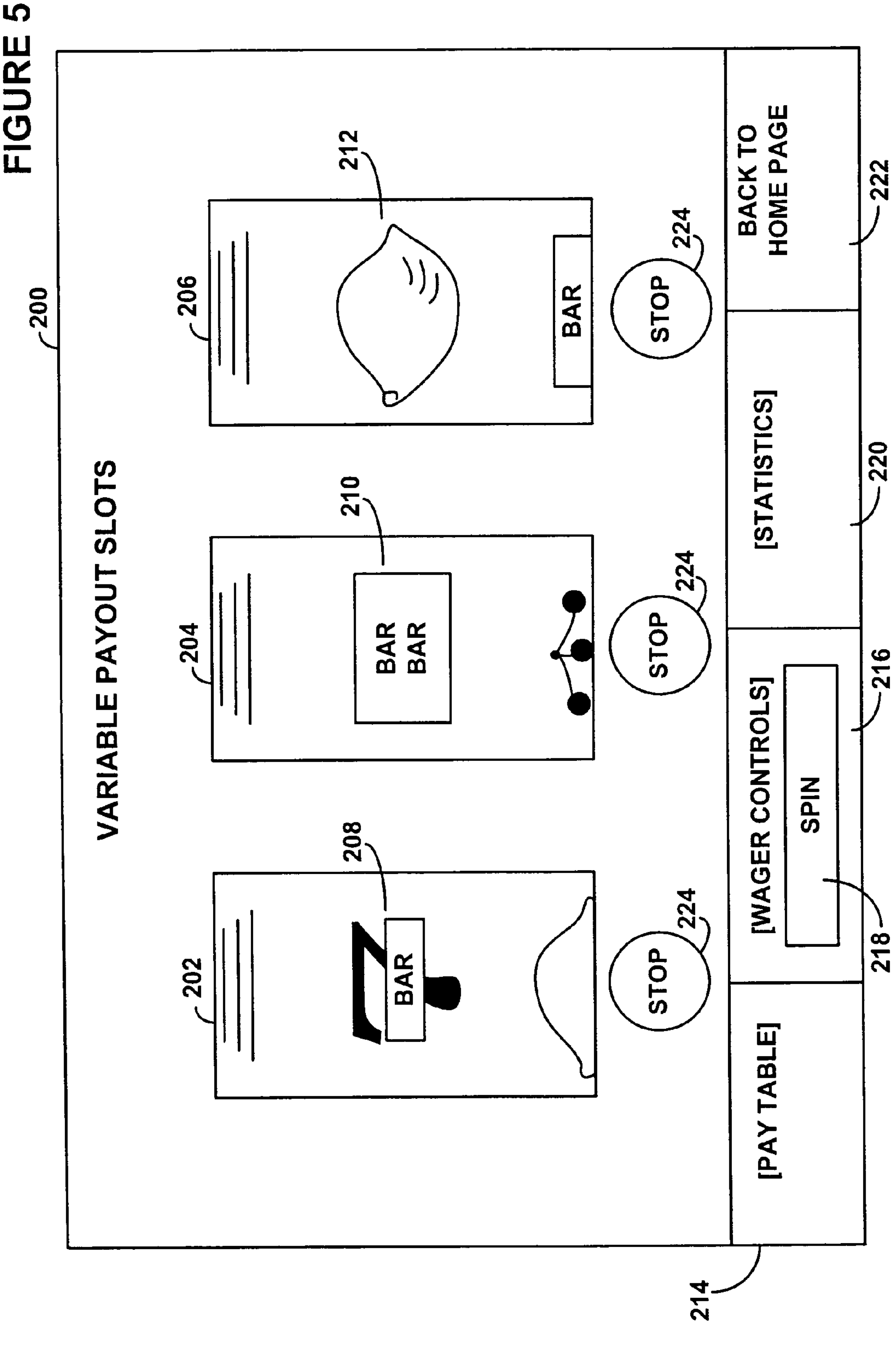
FIG. 5 is a simplified illustration of a screen display on a workstation showing an instance of a slot machine game having a variable payout feature.

FIG. 5 is a simplified example of a screen display 200 appearing on the graphical user interface of the workstation (4) of FIG. 1 or (106) of FIG. 4. The variable payout game in this instance is a slots-type game including reels (202), (204) and (206), which display indicia BAR 7 (208), BAR BAR (210) and LEMON (212), respectively. This workstation in this instance is a Pachislo-type game and includes a stop button or icon (224) which the player can activate to stop the individual reels from spinning. The display further includes a pay table (214), wagering controls (216) including a spin icon (218), optional play statistics (220) such as the total amount wagered, amount won or lost, number of turns, or other information, and a navigation field (222) which allows the player to go back to a home page where a menu of games is presented. The particular graphical user interface details are not particularly important and FIG. 5 is offered by way of example and not limitation. The display (200) of FIG. 5 may be different depending on whether it is designed for display on a workstation (4) representing a personal computer or other type of computing device used to connect to a gaming server over the Internet, or whether the workstation is a terminal in a casino. Furthermore, if the workstation communicates over a low bandwidth connection to the gaming server or uses a small screen display (such as a cell phone), the graphic design of the screen display may also vary.

Grouping of Participants with Display of Other Instances of Games

In one variation, the gaming server (2) operates under control of a stored server program capable of enabling a predetermined number, say 8, of players to be grouped together and each play their own instance of a variable payout game, but also to observe the action occurring substantially simultaneously on the workstations of all the other players in the group. Such players could be all registered with the same casino website 3 (FIG. 1), or, alternatively, such players could be registered with different casino websites (3) and pooled together into one overall pool of available players. When the number of active players reaches this predetermined maximum number, e.g., 8, the server program causes a further grouping to be initiated, the new grouping also being capable of accommodating a further 8 players. In this manner, the gaming server is capable, under stored server program control, to spawn as many separate groupings to accommodate a pool of players who desire to play the variable payout game and essentially "look in" on how others are doing. Each instance of the variable payout game (e.g., variable payout slots game) spawned in this manner is treated as totally independent of the other instances of the game. This embodiment may incorporate the grouping features set forth in PCT application PCT/IB2004/003179, assigned to the assignee of this invention, the contents of which are incorporated by reference herein. This embodiment may also incorporate the grouping features set forth in U.S. application Ser. No. 11/221,074 filed Sep. 6, 2005, the contents of which are incorporated by reference herein.

In this embodiment, the GUI display on the workstation (4) presents to the player, on the display monitor (5), a display of the reels of a three-reel video slots game representing their own instance of the game. The GUI also presents to the player a display of up to seven further sets of reels of a three-reel video slots game. These further sets of reels correspond to the instances of the video slots game played by other players that are in the same group as the instant player. The display of the other instances of play may be provided for presentation purposes only in order that each player can follow the progress of all the instances of the video slots games played. The GUI distinguishes a player's own set of reels, i.e., instance of the single-player game, from those of the other participating players. Each set of reels is identified by a corresponding name, which might be a name assumed by the participating player for participation in the multiplayer slots game, or the participating player's own name.

Figure 6:
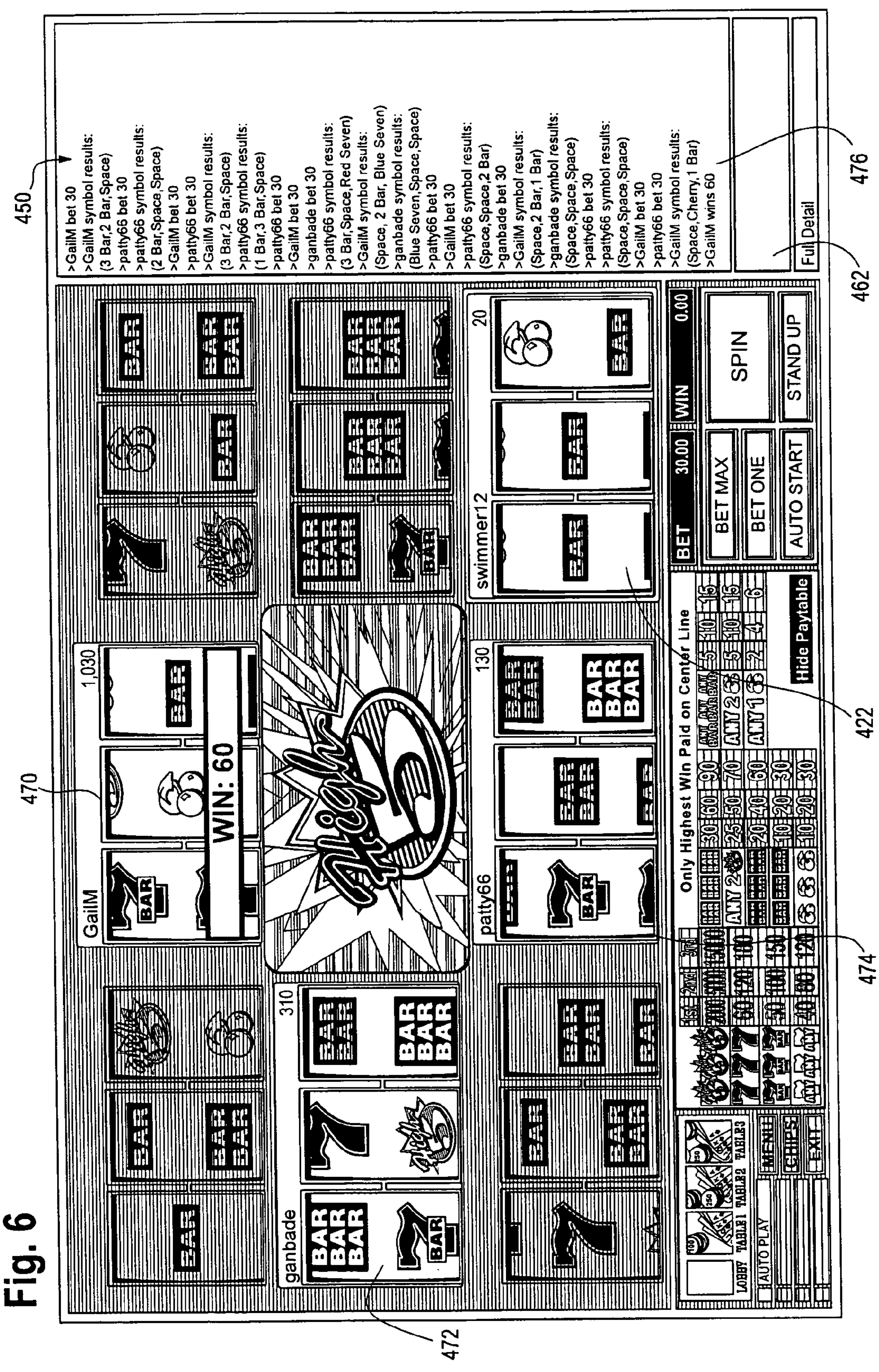
FIG. 6 is an illustration of a screen display on a workstation showing an instance of a slot machine game having a variable payout feature, wherein the screen display shows instances of other slots games played on other workstations, e.g., other remotely located computers or other slot machine terminals in a casino environment.

FIG. 6 is a screen shot of games occurring in the video slots grouping, wherein there are four players which are currently active. Each player's slot machine reel is lit up and their screen name is presented immediately above the slot machine reels—Swimmer 12, Patty 66, Ganbade, and GailM. The display on the workstation shows not only the player's own slot machine game instance 422 (located in the bottom right of the game area of the display, "Swimmer 12"), but also simultaneously a display of the outcome of second, third and fourth instances of the single-player game occurring on the three other gaming workstations, as indicated by the reels (470), (472) and (474). A window (450) on the right hand side of the display shows the results of each instance of the single-player game, e.g., in a scrolling text format.

Note further that when any of the players has a winning event, that event is shown superimposed over that player's reel. For example GailM (reel (470)) won 60 units. The central gaming server (2) sends datagram to all the workstations in the group that contain the outcomes of play in each of the instances active in the group.

The client application may also include a chat box (462) by which a player can enter chat messages which are transmitted to the central gaming server (2) and then forwarded to each of the workstations in the grouping. This feature allows the players to chat and comment on the play, exchange speculation on whether their machine is "tight" or "loose", etc.

To further simulate a casino environment, in addition to seeing the play of the other slot machines and provide a facility for chatting back and forth, the illustrated embodiment further may optionally provide for sound effects. In particular, the server process transmits data to the workstations associated with sound effects that are intended to be played on the workstation. The sound effects can consist of sound files, such as .wav files (or some other compressed or uncompressed sound file format, the details of which are not important), or as one or more bits or flags that indicate which of previously stored available sound effects files should be played on the workstation. In the latter example, at some prior point in time the workstation will have downloaded a set of sound files and stored them locally on the hard disk memory of the workstation. Then, when a given flag is received, the gaming application executing on the workstation will select a specific audio file from the set and have it played by a media application present on the workstation. When one of the workstations in the group has a winning result, the datagram may also include a bit that prompts the local application program to execute a .wav audio file to thereby produce celebratory cheers on the workstation since there was a winner. The win is also reflected on the scrolling game results display at (476).

There are a variety of possible sound effects that can be provided to the workstations. These include sound simulating casino background noise (e.g., faint music, talking, game sounds, etc.,) which could be recorded from an actual casino. Another sound could be sound simulating operation of a gaming machine, such as spinning or other machine sounds that are made by a typical slot machine in a land-based casino, or the sound of a roulette wheel spinning, etc. As a further example, the sound could simulate a voice reaction related to an outcome of the play of the game being engaged in at one of the other workstations. For example, if a player won at slots, the gaming server could send a datagram containing celebratory sounds, hooting and hollering, cheers, etc. The voice reaction could be commensurate with the amount of the win, for example. The vocal sound effects could be in either male or female voice, depending on the sex of the player that won.

Considering the total cumulative effect of the sound effects, the instant messaging feature, and the visual display of multiple players' gaming activity simultaneous with the player's own game playing, the total gaming experience provided in this disclosure is significantly enhanced.

Figure 7:
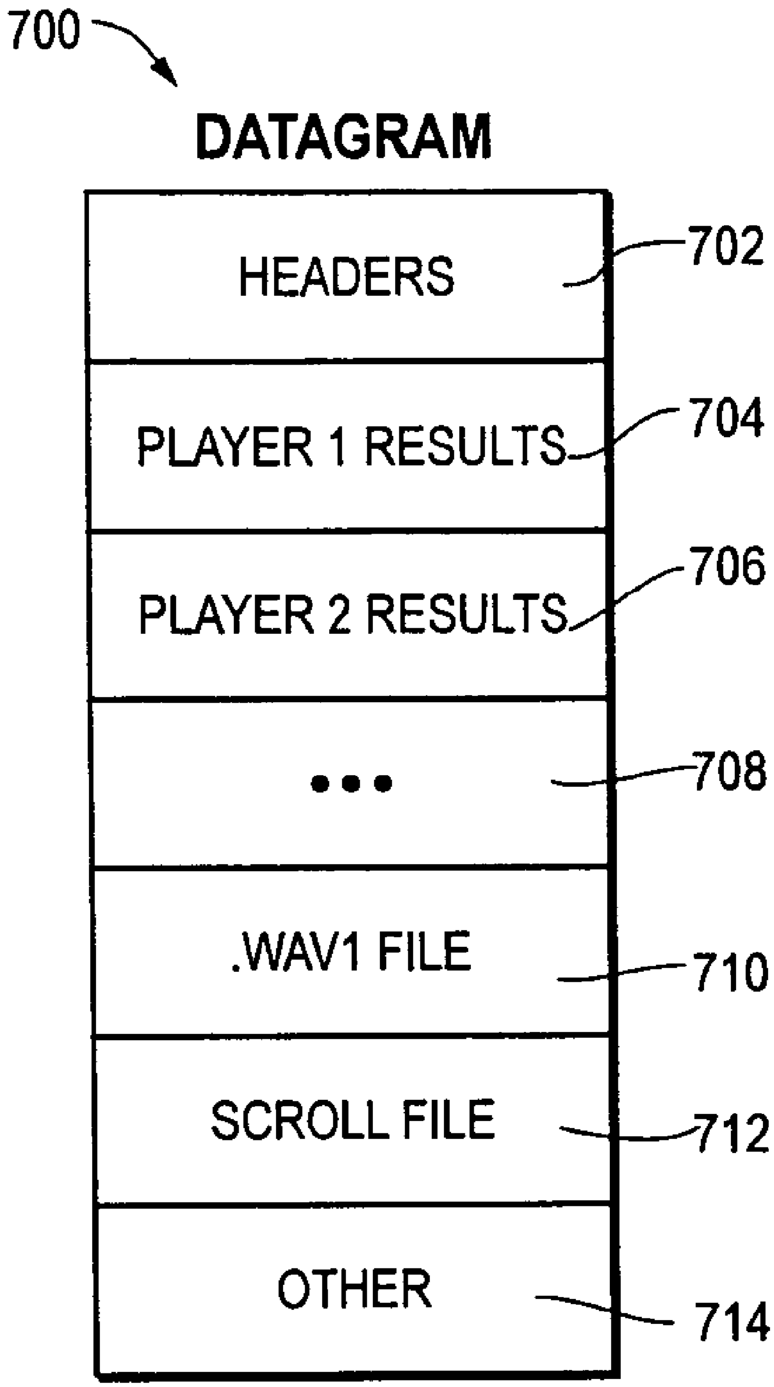
FIG. 7 is an illustration of a datagram generated by the central gaming server of FIG. 1 and sent to a workstation to facilitate the display of outcomes from multiple instances of variable payout games, including instances occurring substantially simultaneously on other workstations.

FIG. 7 is an illustration of a datagram (700) generated by the central gaming server (2) of FIG. 1 and sent to a workstation to facilitate the display of outcomes from multiple instances of single-player variable payout games. The datagram includes a field (702) for headers (such as network address headers, UDP, TCP/IP headers, etc.) related to network transmission functionality and identifying the type or content of the datagram. The datagram further includes a field (704) results for the instance of play associated with the workstation which is receiving the datagram (Swimmer12's workstation in the example of FIG. 6). The results in field (704), e.g., data indicating that the turn of the game produced a SPACE, BAR and a CHERRY, are passed to the local client application executing on the workstation which then causes the GUI display (5) to display the results, as explained above.

The datagram further includes the field (706) for results of play of a second player's workstation. Such information is displayed on the display of the workstation, e.g., in the example of GailM's slot machine reels in FIG. 6. Additional fields (708) are provided as necessary for containing the results of play of other instances of the single-player game that are presented on the display. Field (710) contains a .wav file that indicates sound effects to be played on the workstation. Field (712) contains a text file containing the content of the scroll field in FIGS. 15-18, including any chat messages. Field (714) is used for other data, if necessary.

Game Server Embodiment

In another aspect, the invention can be embodied as a central gaming server facilitating play of a variable payout game (see server (2) of FIG. 1 or server (102) of FIG. 4). The server comprises a processor (CPU, not shown) and a software process coded as a set of instructions for execution by the processor. The software process causes the gaming server to perform the following functions, as explained in detail herein:

(a) making an initial determination of a payout percentage for an instance of the variable payout game (step (54) of FIG. 2 and FIG. 3); and (b) generating one or more results of turns of play of the variable payout game instance in accordance with the initial determination of a payout percentage and transmitting said result(s) of play to the workstation (one of the instances (56)-(66)).

In one particular embodiment, the gaming server process (c) dynamically re-determines the payout percentage for the instance of play (looping back to process (54) in FIGS. 2 and 3 when a triggering event occurs, such as expiration of time period T or number of turns N); and (d) generates one or more further results of turns of play of the variable payout game in accordance with the re-determination of the payout percentage and transmitting said further result(s) of play to the workstation (launching of new game instance (56)-(66), FIGS. 2 and 3).

As noted above, the central gaming server can be one serving remotely located workstations communicating with the gaming server via a computer network such as the Internet (FIG. 1) or a local area network (FIG. 4). The manner of determination of the initial percentage payout and re-determination of the percentage payout in step (c) can be by the methods described above.

While a number of exemplary aspects and embodiments have been discussed above, those of skill in the art will recognize that various modifications, permutations, additions and sub-combinations are within the scope of the disclosure. It is therefore intended that the following appended claims and claims hereafter introduced are interpreted to include all such modifications, permutations, additions and sub-combinations as are within their true spirit and scope.

I claim:

1. A method of facilitating play of a variable payout base game on a plurality of workstations including a first workstation having a display, the variable payout base game having a pay table, comprising the steps of:

(a) at a gaming server, randomly selecting an initial determination of a payout percentage for an instance of the variable payout base game played by the first workstation, the payout percentage being a function of a probability distribution of symbols associated with a result of a turn of play of the variable payout base game;

(b) generating one or more results of turns of play of the variable payout base game instance at the gaming server in accordance with the initial determination of a payout percentage and transmitting said result(s) of play to the first workstation;

(c) at the gaming server, dynamically re-determining by randomly selecting the payout percentage for the instance of play of the variable payout base game played by the first workstation while leaving the pay table unchanged, the re-determined payout percentage being a function of a different probability distribution of symbols associated with a result of a turn of play of the variable payout base game, whereby the player is not alerted to any change in the payout percentage in the random re-determination of the payout percentage due the pay table remaining unchanged; and (d) generating one or more further results of turns of play of the variable payout base game at the gaming server in accordance with the re-determination of the payout percentage in step (c) and transmitting said further result(s) of play to the first workstation, wherein the results of turns of play of the variable payout base game in steps (b) and (d) are generated on demand in response to play of the variable payout base game on the first workstation and wherein the re-determination of the payout percentage is independent of play of the same variable payout base game on other workstations in the plurality of workstations.

2. The method of claim 1, wherein step (c) is performed after N turns of play, where N is a configurable integer parameter greater than or equal to 1.

3. The method of claim 2, where N is between 1 and 1000, inclusive.

4. The method of claim 1, wherein step (c) is performed after the elapsing of a period of time T when consecutive turns of game by the workstation are occurring, wherein T is a configurable parameter.

5. The method of claim 1, wherein there are M predetermined available percentage payouts for an instance of the game, and wherein the determining in steps (a) and (c) comprises a random selection of one of the M predetermined available percentage payouts, and wherein M is an integer greater than or equal to 2.

6. The method of claim 5, wherein each of the M predetermined available percentage payouts for an instance of the game are associated with a weighting factor, and wherein the random selection of one of the M predetermined available percentage payouts in steps (a) and (c) occurs with reference to the weighting factors.

7. The method of claim 6, wherein step (c) is performed after N turns of play, where N is a configurable integer parameter greater than or equal to 1, and wherein N is not the same for each of the M predetermined available percentage payouts.

8. The method of claim 1, wherein the gaming server transmits the results of play in steps (b) and (d) to the workstation over the Internet.

9. The method of claim 1, wherein the gaming server transmits the results of play to the workstation over a local area network.

10. The method of claim 9, wherein the workstation comprises an electronic gaming terminal.

11. The method of claim 1, wherein the variable payout base game comprises a slots game.

12. The method of claim 1, wherein the variable payout game comprises a virtual scratch ticket game.

13. The method of claim 1, wherein in at least one of steps (b) and (d) the gaming server transmits results of a second instance of a variable payout game occurring substantially simultaneously on a second workstation to the workstation, whereby the workstation may simultaneously display on its display the results of play of the instance of the variable payout game being engaged in by both the workstation and by the second workstation.

14. A gaming server facilitating play of a variable payout base game on a plurality of workstations including a first workstation, the variable payout base game having a pay table, comprising:

a processor and a software process coded as a set of instructions for execution by the processor, the software process causing the gaming server to perform the following functions:

(a) randomly selecting an initial determination of a payout percentage for an instance of the variable payout base game played by the first workstation, the payout percentage being a function of a probability distribution of symbols associated with a result of a turn of play of the variable payout base game;

(b) generating one or more results of turns of play of the variable payout base game instance in accordance with the initial determination of a payout percentage and transmitting said result(s) of play to the first workstation;

(c) dynamically re-determining by randomly selecting the payout percentage for the instance of play while keeping the pay table unchanged, the re-determined payout percentage being a function of a different probability distribution of symbols associated with a result of a turn of play of the variable payout base game, whereby the player is not alerted to any change in the payout percentage in the random re-determination of the payout percentage due to the pay table remaining unchanged; and (d) generating one or more further results of turns of play of the variable payout base game in accordance with the re-determination of the payout percentage and transmitting said further result(s) of play to the first workstation;

wherein the results of turns of play of the variable payout base game in steps (b) and (d) are generated on demand in response to play of the variable payout base game on the first workstation and wherein the re-determination of the payout percentage is independent of play of the same variable payout base game on other workstations in the plurality of workstations.

15. The gaming server of claim 14, wherein operation (c) is performed after N turns of play, where N is a configurable integer parameter greater than or equal to 1.

16. The gaming server of claim 14, where N is between 1 and 1000, inclusive.

17. The gaming server of claim 14, wherein process (c) is performed after the elapsing of a period of time T when consecutive turns of game by the workstation are occurring, wherein T is a configurable parameter.

18. The gaming server of claim 14, wherein there are M predetermined available percentage payouts for an instance of the game, and wherein the determining in processes (a) and (c) comprises a random selection of one of the M predetermined available percentage payouts, and wherein M is an integer greater than or equal to 2.

19. The gaming server of claim 18, wherein each of the M predetermined available percentage payouts for an instance of the game are associated with a weighting factor, and wherein the random selection of one of the M predetermined available percentage payouts in processes (a) and (c) occurs with reference to the weighting factors.

20. The gaming server of claim 19, wherein step (c) is performed after N turns of play, where N is a configurable integer parameter greater than 1, and wherein N is not the same for each of the M predetermined available percentage payouts.

21. The gaming server of claim 14, wherein gaming server transmits the results of play to the workstation over the Internet.

22. The gaming server of claim 14, wherein the gaming server transmits the results of play to the workstation over a local area network.

23. The gaming server of claim 22, wherein the workstation comprises an electronic gaming terminal.

24. The gaming server of claim 14, wherein the variable payout game comprises a slots game.

25. The gaming server of claim 14, wherein the variable payout game comprises an electronic scratch ticket game.

26. The gaming server of claim 14, wherein in at least one of steps (b) and (d) the gaming server transmits results of a second instance of a variable payout game occurring substantially simultaneously on a second workstation to the workstation, whereby the workstation may simultaneously display on its display the results of play of the instance of the variable payout game being engaged in by both the workstation and by the second workstation.

27. A method of facilitating play of a variable payout base game on a plurality of workstations including a first workstation having a display, the variable payout base game having a pay table, comprising the steps of:

(a) at a gaming server, randomly selecting an initial determination of a payout percentage for an instance of the variable payout base game played by the first workstation;

(b) generating one or more results of turns of play of the variable payout base game instance at the gaming server in accordance with the initial determination of a payout percentage and transmitting said result(s) of play to the first workstation;

(c) receiving a datagram at the gaming server indicating that the instance of the variable payout game played by the first workstation has been terminated;

(d) receiving a datagram at the gaming server indicating that a new instance of the variable payout base game has been selected at the first workstation;

(e) determining anew by randomly selecting the payout percentage for the new instance of play of the variable payout base game selected at the first workstation, wherein the new payout percentage randomly selected is a function of a probability distribution of symbols associated with a result of a turn of play of the variable payout base game;

(f) generating one or more further results of turns of play of the variable payout base game at the gaming server in accordance with the determination anew of the payout percentage and transmitting said further result(s) of play to the first workstation;

(g) dynamically re-determining by randomly selecting the payout percentage for the new instance of the variable payout base game while keeping the pay table unchanged, the re-determined payout percentage being a function of a different probability distribution of symbols associated with a result of a turn of play of the variable payout base game, whereby the player is not alerted to any change in the payout percentage due to the pay table remaining unchanged; and (h) generating one or more further results of turns of play of the new instance of the variable payout base game in accordance with the re-determination of the payout percentage in step (g) and transmitting said further result(s) of play to the first workstation; and wherein the results of turns of play of the variable payout base game in steps (b), (f) and (h) are generated on demand in response to play of the variable payout base game on the first workstation and wherein re-determination of the payout percentage in steps (e) and (g) is independent of play of the same variable payout base game on other workstations in the plurality of workstations.

28. The method of claim 27, wherein there are M predetermined available percentage payouts for an instance of the game, and wherein the determining in steps (a) and (e) comprises a random selection of one of the M predetermined available percentage payouts, and wherein M is an integer greater than or equal to 2.

29. The method of claim 28, wherein each of the M predetermined available percentage payouts for an instance of the game are associated with a weighting factor, and wherein the random selection of one of the M predetermined available percentage payouts in steps (a) and (e) occurs with reference to the weighting factors.

30. The method of claim 28, further comprising the step of dynamically re-determining the payout percentage of the instance of play prior to the receipt of the datagram in step (c).

31. The method of claim 30, wherein the re-determining prior to receipt of the datagram in step (c) occurs based on at least one of: i) the number of turns of the instance of the game, and ii) the amount of elapsed time of play of the instance of the game.

* * * * *